United States Patent [19]
Greiner et al.

[11] Patent Number: 5,407,758
[45] Date of Patent: Apr. 18, 1995

[54] MATERIAL FOR THE METAL COMPONENTS OF HIGH-TEMPERATURE FUEL CELL SYSTEMS

[75] Inventors: Horst Greiner, Forchheim, Germany; Ralf Eck, Reutte, Austria; Günter Kneringer, Reutte, Austria; Wolfgang Köck, Reutte, Austria

[73] Assignee: Siemens Aktiengesellschaft, Munich, Germany

[21] Appl. No.: 93,049

[22] Filed: Jul. 16, 1993

[30] Foreign Application Priority Data

Jul. 16, 1992 [EP] European Pat. Off. ............ 92112123

[51] Int. Cl.⁶ .................... H01M 8/12; C22C 27/06
[52] U.S. Cl. ................................. 429/33; 429/34; 420/428; 148/423
[58] Field of Search .................... 429/30, 33, 34; 420/428; 148/423

[56] References Cited

U.S. PATENT DOCUMENTS 3,017,265  1/1962  McGurty et al. ............... 420/428 X
3,516,865  6/1970  Tedmon, Jr. et al. .

FOREIGN PATENT DOCUMENTS 338823  10/1989  European Pat. Off. .
411374  2/1991  European Pat. Off. .
425939  5/1991  European Pat. Off. .
510495  10/1992  European Pat. Off. .
4009138  9/1991  Germany .

OTHER PUBLICATIONS

Patent Abstract of Japan, vol. 15007, Jan. 9, 1991: & JP 890080871 (Kubota) Mar. 30, 1989.
Phys. Chem. 94, 978–981 (Mar. 1990) Tiffee et al. "Ceramic and Metallic Components for a Planar SOFC".

*Primary Examiner*—John S. Maples
*Attorney, Agent, or Firm*—Herbert L. Lerner; Laurence A. Greenberg

[57] ABSTRACT

A material for metal components, such as bipolar plates and window foils of high-temperature fuel cell systems, has ceramic solid electrolytes made of yttrium-stabilized zirconium oxide. The material includes a chromium alloy having from 3 to 10 atom % iron and from 0.5 to 5 atom % of rare earth metal and/or rare earth metal oxide, having a coefficient of thermal expansion at a temperature of 200° C. amounting to from $8.5 \times 10^{-6}$ to $10.5 \times 10^{-6}$ per kelvin by which the temperature rises, and attaining a value at 900° C. in a range from $14 \times 10^{-6}$ to $15 \times 10^{-6}$.

8 Claims, 3 Drawing Sheets

MATERIAL FOR THE METAL COMPONENTS OF HIGH-TEMPERATURE FUEL CELL SYSTEMS

BACKGROUND OF THE INVENTION

1. Field of the Invention

The invention relates to a material for the metal components of high-temperature fuel cell systems, which are provided with ceramic solid electrolytes being formed of yttrium-stabilized zirconium oxide.

High-temperature fuel cell systems, which are also known as solid oxide fuel cell (SOFC) systems, are suitable for converting not only hydrogen gas but also hydrocarbons, such as natural gas or liquid-storable propane, because of relatively high operating temperatures which are in the range from 800° to 1100° C., in contrast to low-temperature fuel cell systems. If carbon dioxide and water vapor are added to the fuel, then at the high temperatures resulting from fuel conversion, it is possible to avoid any soot formation. In such high-temperature fuel cell systems, solid electrolytes are used for temperature reasons. In the case of such applications, it is known to insert ceramic solid electrolyte plates between the electrodes, with the plates substantially being formed of zirconium oxide and small amounts of additives, such as yttrium oxide. In known constructions, the solid electrolyte plates, along with electrodes on both sides and with the interposition of electrically conductive window foils, are connected to so-called bipolar plates which have good electrical conductivity, and have a grooved surface structure which assures the inflow of fuel and oxidizer. A number of such fuel cells is then stacked one above the other and therefore electrically connected in series, thus forming a fuel cell module or stack. A plurality of such stacks can then be assembled to make fuel cell systems.

Due to the high operating temperature, the ceramic solid electrolyte plates are exposed to severe mechanical strains when the fuel cell system heats up upon startup of operation or cools down again to room temperature after operation is turned off and the other components, such as bipolar plates and window foils contacting the solid electrolyte plates, also have coefficients of thermal expansion that differ only slightly from one another. Such strains can cause cracking in the solid electrolyte plate and shorten the service life of the high-temperature fuel cell module considerably.

German Published, Non-Prosecuted Application DE 40 09 138 A1 discloses a solid electrolyte high-temperature fuel cell module in which window foils and bipolar plates contacting solid electrolyte plates made of yttrium-stabilized zirconium oxide, are made of a chromium-nickel alloy with nickel contents of from 5 to 15 weight %, or an iron-chromium-aluminum alloy with contents of 5 to 15 weight % of molybdenum and/or 5 to 15 weight % of tungsten. It is a characteristic of the first of those alloys that it is quite well adapted in its coefficient of expansion to the coefficient of expansion of the solid electrolyte. Unfortunately, its resistance to corrosion is not completely satisfactory. The situation for the second of those alloys is the reverse.

SUMMARY OF THE INVENTION

It is accordingly an object of the invention to provide a material for the metal components of high-temperature fuel cell systems, which overcomes the hereinafore-mentioned disadvantages of the heretofore-known devices of this general type and which indicates a way in which the cycle strength of solid electrolyte high-temperature fuel cell systems can be increased even further.

With the foregoing and other objects in view there is provided, in accordance with the invention, a material for metal components of high-temperature fuel cell systems having ceramic solid electrolytes made of yttrium-stabilized zirconium oxide, comprising a chromium alloy having from 3 to 10 atom % iron and from 0.5 to 5 atom % of rare earth metal and/or rare earth metal oxide, having a coefficient of thermal expansion at a temperature of 200° C. amounting to from $8.5 \times 10^{-6}$ to $10.5 \times 10^{-6}$ per kelvin by which the temperature rises, and attaining a value at 900° C. in a range from $14 \times 10^{-6}$ to $15 \times 10^{-6}$. Since according to the invention a material is used for the metal components of high-temperature fuel cell systems which are provided with ceramic solid electrolytes made of yttrium-stabilized zirconium oxide, which material is formed of a chromium alloy having from 3 to 10 atom % iron and from 0.5 to 5 atom % rare earth metal and/or rare earth metal oxide, and having a coefficient of thermal expansion, at a temperature of 200° C., which amounts to from $8.5 \times 10^{-6}$ through $10.5 \times 10^{-6}$ per kelvin by which the temperature rises, and at 900° C. attains a value in the range from $14 \times 10^{-6}$ through $15 \times 10^{-6}$, an essential prerequisite is achieved for minimizing the differences in expansion that occur both in cooling down and in reheating for the dimensions given, in such a way that the ceramic solid electrolyte, which substantially is formed of zirconium oxide, can elastically absorb the strains involved without developing cracks. The fact that the solid electrolyte plates can absorb only relatively slight tensile strains, because of their high brittleness and low tensile strength, is taken into account. Moreover, for this purpose with a chromium alloy, a material is used which excels due to good corrosion and diffusion performance under the physical and chemical conditions prevailing in high-temperature fuel cells.

In accordance with another feature of the invention, the mean coefficient of thermal expansion of the material in the entire range from 0° to 1000° C. may deviate by less than 10% from the coefficient of expansion of the yttrium-stabilized zirconium oxide. As a result, the yttrium-stabilized zirconium oxide plates, which are warm-soldered to the metal window foils, only briefly pass through temperature zones with slight strains, upon heating up or cooling down.

In accordance with a further feature of the invention, the material is a $CrFe5Y_2O_31$ alloy. The mean coefficient of expansion of such an alloy, in the range from 0° to 1000° C., matches the coefficient of expansion of an yttrium-stabilized solid electrolyte plate containing zirconium oxide, within 5%.

In accordance with an added feature of the invention, the rare earth metal is yttrium.

In accordance with an additional feature of the invention, the metal component is a bipolar plate.

In accordance with a concomitant feature of the invention, the metal component is a window foil.

Other features which are considered as characteristic for the invention are set forth in the appended claims.

Although the invention is illustrated and described herein as embodied in a material for the metal components of high-temperature fuel cell systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
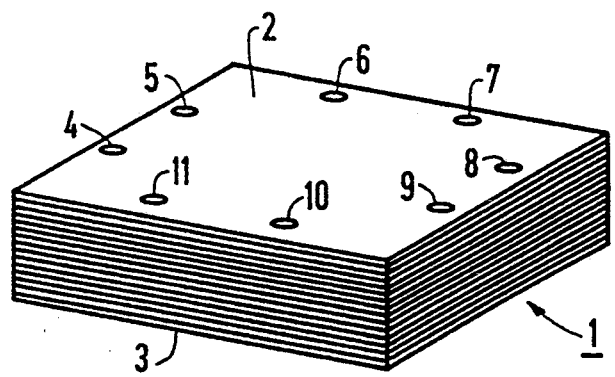
FIG. 1 is a diagrammatic, perspective view of a solid electrolyte high-temperature fuel cell module.

Referring now to the figures of the drawing in detail and first, particularly, to FIG. 1 thereof, there is seen a perspective view which shows that a solid electrolyte high-temperature fuel cell module 1 includes a plurality of rectangular, or in the exemplary embodiment square, platformlike elements, which are stacked one above the other and have uppermost and lowermost plates, each being a so-called cover plate 2, 3, which have eight circular through holes 4, 5, 6, 7, 8, 9, 10, 11 in a peripheral region for feeding in fuel or fuel gas and air or oxygen. In the solid electrolyte high-temperature fuel cell module 1 shown in FIG. 1, elements are located in the following order under the top cover plate: a window foil shown in FIG. 6, a solid electrolyte element shown in FIGS. 4 and 5, a further window foil, a bipolar plate shown in FIGS. 2 and 3, a further window foil, a further solid electrolyte element, a further window foil, a further bipolar plate, etc. Each solid electrolyte element located between two adjacent bipolar plates, the window foils directly contacting the sides of the solid electrolyte element, and the sides of each of the two bipolar plates contacting the window foils, together form one solid electrolyte high-temperature fuel cell.

Figure 2:
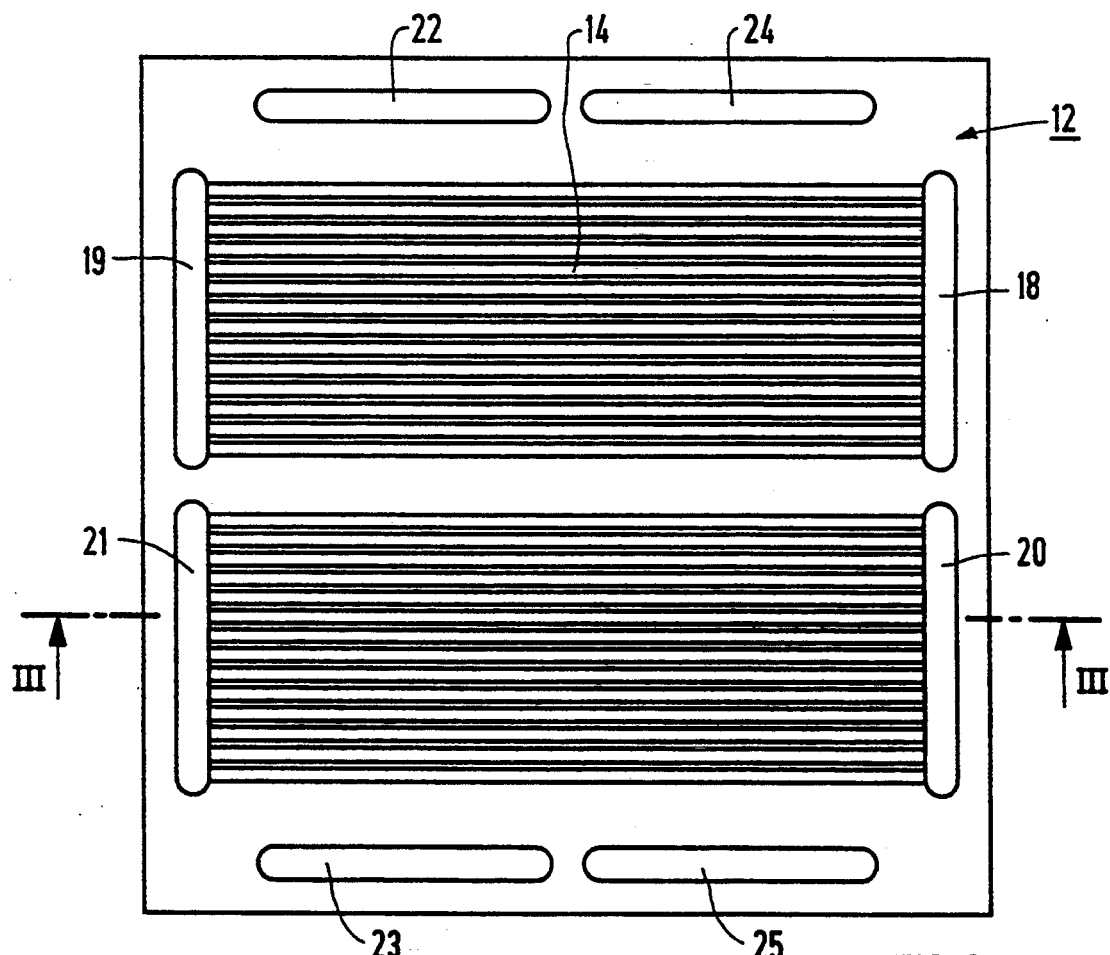
FIG. 2 is a plan view of a bipolar plate of the fuel cell module of FIG. 1.
Figure 3:
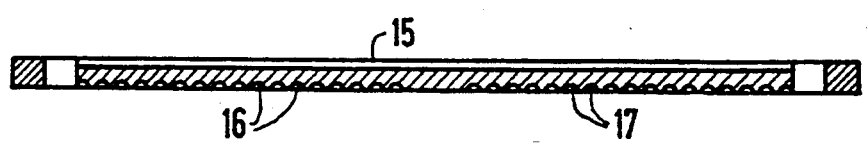
FIG. 3 is a sectional view taken along a line III—III of FIG. 2, in the direction of the arrows.

The plan view of FIG. 2 shows the construction of a bipolar plate 12 made on the crosscurrent principle. The bipolar plate 12 is constructed in one piece and is formed of a material with good electrical conductivity, having a coefficient of thermal expansion in a temperature range from 0° to 1000° C. which is as close as possible to that of solid electrolyte plates 28 to be described below. In the exemplary embodiment, the material of the bipolar plate 12 is a CrFe5Y$_2$O$_3$1 alloy. On each of its two sides, the bipolar plate 12 includes two groove fields 14, 15, 16, 17, which are parallel and cover virtually the entire surface of the bipolar plate with the exception of a peripheral region. Grooves in these fields are parallel and located immediately next to one another. The grooves discharge at both ends into one slitlike opening 18, 19, 20, 21, 22, 23, 24, 25 on each end in the peripheral region of the bipolar plate 12. The other side of the bipolar plate is constructed exactly like the side shown, with the sole difference being that there the groove fields 16, 17 are rotated through 90° relative to the groove fields 14, 15 on the side shown and therefore discharge into the slitlike openings 22, 23, 24, 25 located laterally of the groove fields 14, 15. This is also clearly shown from the sectional view in FIG. 3, in which a groove is cut longitudinally on the top while on the bottom the grooves of the two groove fields 16, 17 are cut crosswise.

Only the two bipolar plates 2, 3 serving as a top and a bottom cover plate of the solid electrolyte high-temperature fuel cell module 1 have no grooves in their respective outer surfaces. Additionally, the slitlike openings in them are not milled all of the way through but rather are merely countersunk down to the depth of the groove on the side that has the grooves. In the region of this slitlike countersinking, there is only one through hole 4, 5, 6, 7, 8, 9, 10, 11 each in the exemplary embodiment, by way of which various non-illustrated lines for the fuel or the oxygen carriers can be connected from the outside.

Figure 4:
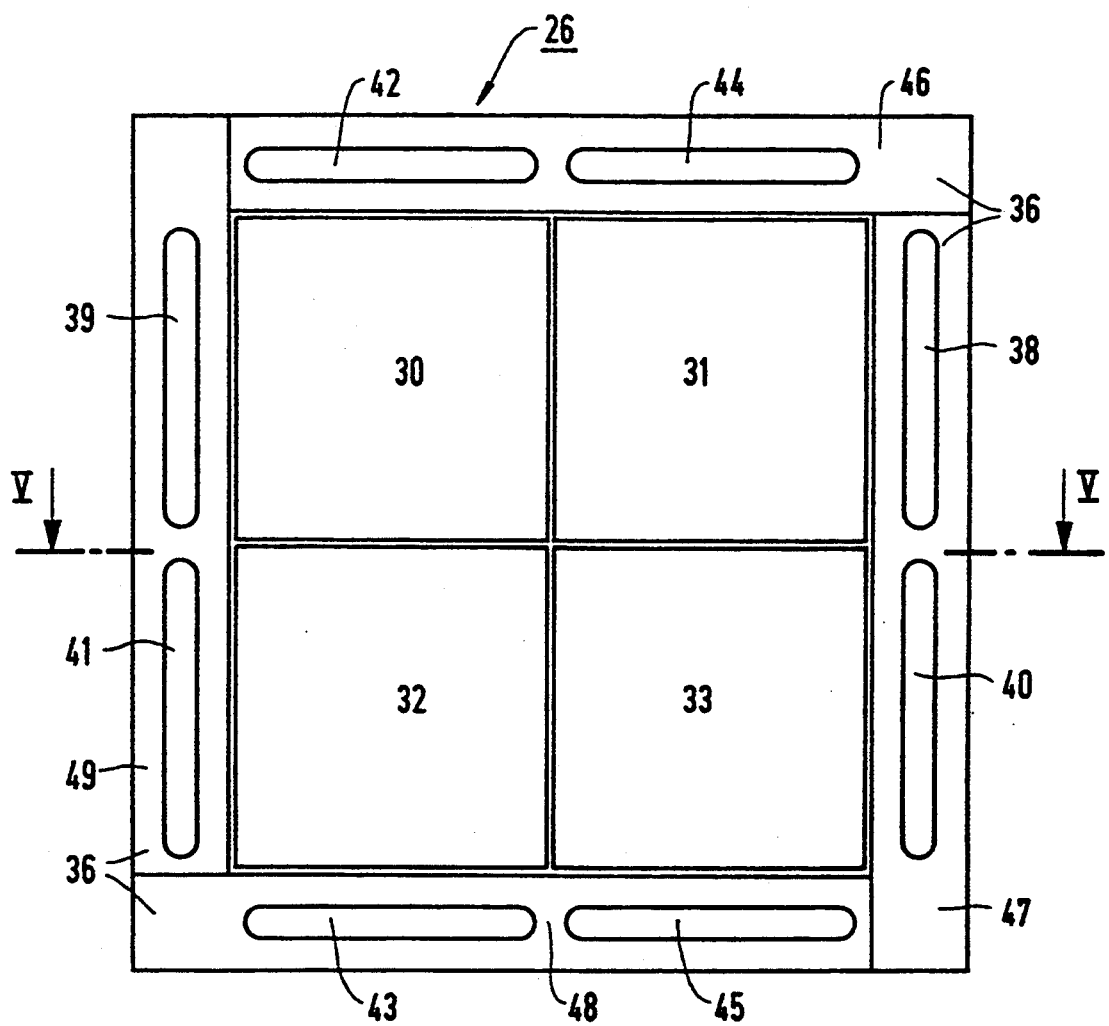
FIG. 4 is a plan view of a solid electrolyte element of the fuel cell module taken along a line IV—IV of FIG. 5, in the direction of the arrows.
Figure 5:
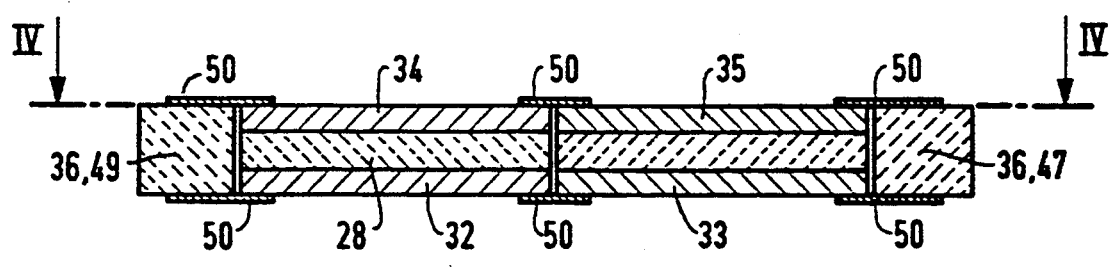
FIG. 5 is a sectional view taken along a line V—V of FIG. 4, in the direction of the arrows.

FIG. 4 shows a plan view of a solid electrolyte element 26 of the fuel cell module shown in FIG. 1. From this plan view and from the section shown in FIG. 5, it can be seen that the element 26 includes four rectangular solid electrolyte plates 28 and electrodes 30, 31, 32, 33, 34, 35 applied to both sides of the solid electrolyte plates. The electrodes on one side are constructed as a cathode and on the opposite side are constructed as an anode. The cathodes in the exemplary embodiment are formed of an La$_x$Sr$_y$MnO$_3$ ceramic. The anodes in the exemplary embodiment are formed of a nickel-oxide or nickel-zirconium oxide cermet. In the exemplary embodiment, the solid electrolyte plates are of yttrium-stabilized zirconium oxide. The solid electrolyte plates 28 of each solid electrolyte element 26 which are coated with the cathode and anode material, are placed in an electrically insulating frame 36. In the exemplary embodiment, the insulating frame 36 is formed of MgO-/Al$_2$O$_3$ spinel and has slitlike openings 38, 39, 40, 41, 42, 43, 44, 45 formed therein which coincide with the slitlike openings 18-25 in the bipolar plate 12. This frame 36 is soldered on both sides over a large surface area onto the window foils resting on it. The soldering is accomplished with a solder 50 that melts at the operating temperature. Aside from the differing cathode and anode material, the geometrical structure of the solid electrolyte element is identical on both sides. In the exemplary embodiment, the frame 36 is not made in one piece but rather is made up of four sealing strips 46, 47, 48, 49. The MgO/Al$_2$O$_3$ spinel, of which the frame is formed, is adequately temperature-proof and gas-tight, and has an electrical conductivity that is very low.

Figure 6:
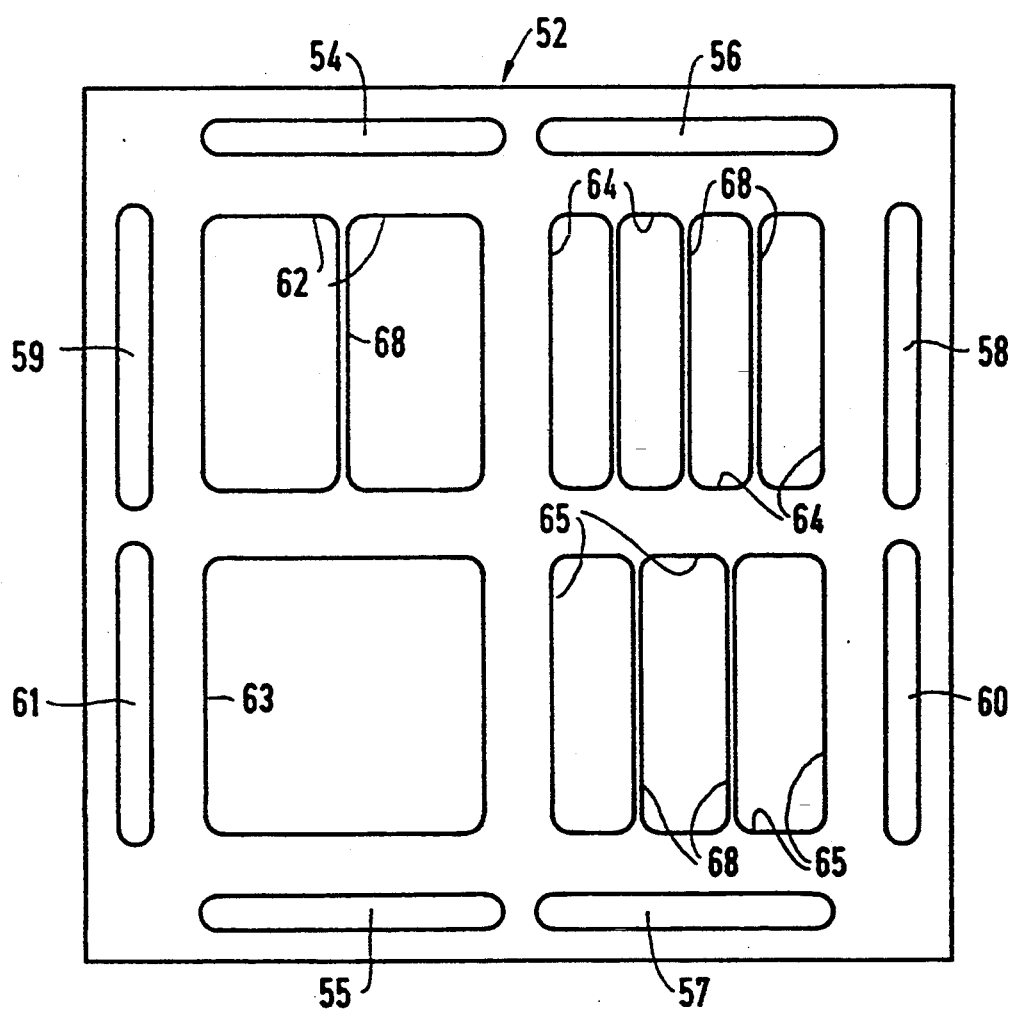
FIG. 6 is a plan view of a window foil of the fuel cell module of FIG. 1.

FIG. 6 shows a plan view of a window foil 52 of the fuel cell module 1 shown in FIG. 1. In the exemplary embodiment, the window foil is formed of the same material as the bipolar plate 12. The window foil 52 has the same external dimensions as the bipolar plate 12 and on its edges it has slitlike openings 54, 55, 56, 57, 58, 59, 60, 61, which are disposed in such a way as to coincide with the slitlike openings 18-25 in the bipolar plate. The window foil 52 also has four window openings 62, 63, 64, 65 formed therein, which are disposed and positioned in such a way that when they rest on the bipolar plate, they come to rest above the groove fields 14, 15, 16, 17. The window openings may be equipped without any divider bar or web, as in the case of the lower left window 63, or they may be equipped with a plurality of divider bars or webs 68 extending in coincidence with the edges of the groove fields 14, 15 of the bipolar plate 12, as in the other windows 62, 64, 65. These bars or webs serve the function of supporting the electrodes 30, 31, 32, 33, 34, 35 of the solid electrolyte element 36 and of carrying away the electric current.

During operation of the solid electrolyte high-temperature fuel cell module 1, the fuel is fed through the through holes 8, 9 built into the two cover plates 2, 3 in one side of the stack. The fuel then flows into the slitlike openings 18, 20 in the bipolar plate 12 that communicate with these through holes 8, 9 and through the slitlike openings 38, 40, 58, 60 that are disposed in such a way as to coincide with the openings 18, 20, and into the window foils 52, the solid electrolyte elements 26 and the bipolar plates 12 located beneath them, all of the way through the entire stack and through the grooves, while communicating with these slitlike openings in the various bipolar plates and in the various groove fields 14, 15 to reach the slitlike openings 19, 21 in the opposite side of the stack. The fuel flows from the slitlike openings 19, 21 back out again through the bores 4, 5 in the two cover plates 2, 3 of the solid electrolyte high-temperature fuel cell module 1. In the same way, the oxygen, or the air in the exemplary embodiment, flows through the bores 6, 7 formed in the sides of the two cover plates 2, 3 adjacent the fuel supply lines and through the slitlike openings 22, 24 in the two cover plates communicating with these bores 6, 7, into the slitlike openings 42, 44, 54, 56 coinciding with the openings 22, 24 and below them into the window foils 52, the solid electrolyte elements 26 and the bipolar elements 12 and so forth, through the entire stack. The air flows from the slitlike openings in the bipolar plates 12 into the grooves of the various groove fields 16, 17 communicating with them, to the opposite slitlike openings 23, 25, and from there back out again through the through holes 10, 11 in the two cover plates 2, 3 communicating with them. The solid electrolyte element is oriented in such a way that its cathode side faces toward the oxygen-carrying groove fields of the adjacent bipolar plate, and its anode side faces toward the fuel-carrying groove fields of the other, adjacent bipolar plate. The directions of fuel and oxygen flow are therefore at right angles to one another. This is known as the crosscurrent principle.

Upon passing through the groove fields, the oxygen is in direct contact with the cathodes of the various solid electrolyte elements. At the phase boundary between the cathode and the solid electrolyte, the $O_2$ molecules from the air are converted by picking up electrons into $O^{2-}$ ions. As $O^{2-}$ ions, they can migrate through the zirconium oxide solid electrolyte, through oxygen voids. In the process, they finally reach the anode, where at the phase boundary between the anode and the solid electrolyte they react with the fuel gas, giving up electrons, to form carbon dioxide and water vapor. The carbon dioxide and water vapor mixture forming upon oxidation of the fuel gas is then drawn off again, together with the fuel gas. In the process, the fuel can be separated externally, in a manner that is not shown in detail herein, from the products of combustion, $CO_2$ and $H_2O$, and fed back into the fuel supply line. The potential differences that develop at the anode and cathode are connected in series with one another by means of the various good-conducting window foils 52 and bipolar plates 12, both of which are formed of a CrFe5Y$_2$O$_3$1 alloy. The sum of the series-connected potentials of the various fuel cells 1 can be tapped at the cover plates.

Since a CrFe5Y$_2$O$_3$1 alloy is used for both the window foils and for the bipolar plates, these platformlike components which rest directly on the various solid electrolyte elements have a coefficient of expansion that largely matches the coefficient of expansion of the solid electrolyte made of yttrium-stabilized zirconium oxide, over the entire temperature range from 0° C. to 1000° C. The difference between these two coefficients of expansion, of the solid electrolyte plates on one hand and window foils and bipolar plates on the other hand, is so slight that at the given dimensions of 5 cm for the solid electrolyte, differences in expansion are produced that are still within the range of elasticity of the ceramic material of the solid electrolyte element. As a result, cracking in the solid electrolyte, which can otherwise occur with frequent switching on and off of the high-temperature fuel element and with the attendant severe temperature changes, is avoided. Since the mean coefficient of expansion of the alloy in the temperature range from 0° C. to 1000° C. is only slightly above the coefficient of expansion of yttrium-stabilized zirconium oxide, then beginning at the soldering temperature at which the window foil is soldered onto the solid electrolyte element, the latter element tends to be more compressed than expanded at lower temperatures. This compensates for the low tensile strength of the solid electrolyte.

The metal components that should preferably be made of the aforementioned alloys are understood to include not only the bipolar plates and the bottom or top cover plates and the window foils, but also support structures, pipelines, and current collectors. These components should also have the same coefficient of expansion, in order to avoid strains in the module, or between the modules of a system.

We claim:

1. In high-temperature fuel cell systems having ceramic solid electrolytes made of yttrium-stabilized zirconium oxide, the improvement which comprises electrically conducting metallic components of the fuel cell systems formed of a chromium alloy, the chromium alloy comprising from 3 to 10 atom % iron and from 0.5 to 5 atom % of at least one of rare earth metal and rare earth metal oxide, having a coefficient of thermal expansion at a temperature of 200° C. amounting to from $8.5 \times 10^{-6}$ to $10.5 \times 10^{-6}$ per Kelvin, which coefficient of thermal expansion increases with rising temperature and attains a value at 900° C. in a range from $14 \times 10^{-6}$ to $15 \times 10^{-6}$.

2. The material according to claim 1, wherein the mean coefficient of thermal expansion in an entire temperature range from 0° to 1000° C. always deviates from the coefficient of expansion of the yttrium-stabilized zirconium oxide by less than 10%.

3. The material according to claim 1, wherein the alloy is a CrFe5Y$_2$O$_3$1 alloy.

4. The material according to claim 1, wherein the rare earth metal is yttrium.

5. The material according to claim 1, wherein the rare earth metal is lanthanum.

6. The material according to claim 1, wherein the rare earth metal is yttrium and lanthanum.

7. A bipolar metal plate of a high-temperature fuel cell system having ceramic solid electrolytes made of yttrium-stabilized zirconium oxide, comprising a chromium alloy having from 3 to 10 atom % iron and from 0.5 to 5 atom % of at least one of rare earth metal and rare earth metal oxide, having a coefficient of thermal expansion at a temperature of 200° C. amounting to from $8.5 \times 10^{-6}$ to $10.5 \times 10^{-6}$ per Kelvin, which coefficient of thermal expansion increases with rising temperature and attains a value at 900° C. in a range from $14 \times 10^{-6}$ to $15 \times 10^{-6}$.

8. A metal window foil of a high-temperature fuel cell system having ceramic solid electrolytes made of yttrium-stabilized zirconium oxide, comprising a chromium alloy having from 3 to 10 atom % iron and from 0.5 to 5 atom % of at least one of rare earth metal and rare earth metal oxide, having a coefficient of thermal expansion at a temperature of 200° C. amounting to from $8.5 \times 10^{-6}$ to $10.5 \times 10^{-6}$ per Kelvin, which coefficient of thermal expansion increases with rising temperature and attains a value at 900° C. in a range from $14 \times 10^{-6}$ to $15 \times 10^{-6}$.

* * * * *